United States Patent
Roy, Jr. et al.

(10) Patent No.: US 8,868,341 B1
(45) Date of Patent: Oct. 21, 2014

(54) PERSONNEL ACCOUNTABILITY AN SAFETY SYSTEM

(71) Applicants: James Roy, Jr., Lafayette, LA (US); Carrol Raymond, Jr., Youngsville, LA (US); Dwayne Lalande, Lafayette, LA (US)

(72) Inventors: James Roy, Jr., Lafayette, LA (US); Carrol Raymond, Jr., Youngsville, LA (US); Dwayne Lalande, Lafayette, LA (US)

( * ) Notice: Subject to any disclaimer, the term of this patent is extended or adjusted under 35 U.S.C. 154(b) by 0 days.

(21) Appl. No.: 13/986,966

(22) Filed: Jun. 19, 2013

(51) Int. Cl.
*G01C 21/00* (2006.01)

(52) U.S. Cl.
CPC .................................... *G01C 21/00* (2013.01)
USPC ........................................................ 701/482

(58) Field of Classification Search
None
See application file for complete search history.

(56) References Cited

U.S. PATENT DOCUMENTS

| | | | |
|---|---|---|---|
| 7,457,724 B2 | 11/2008 | Vock | |
| 7,683,782 B2 | 3/2010 | Christopher | |
| 2009/0177603 A1 | 7/2009 | Honisch | |
| 2010/0308999 A1 | 12/2010 | Chornenky | |
| 2011/0152637 A1 | 6/2011 | Kateraas | |
| 2011/0245633 A1 | 10/2011 | Goldberg | |
| 2011/0300875 A1* | 12/2011 | Kim et al. | 455/456.1 |
| 2012/0078440 A1* | 3/2012 | Oravis et al. | 701/1 |

FOREIGN PATENT DOCUMENTS

| WO | WO2006/046068 | 5/2006 |
|---|---|---|
| WO | WO2008/051504 | 5/2008 |

* cited by examiner

*Primary Examiner* — Thomas Tarcza
*Assistant Examiner* — Adam Alharbi

(57) ABSTRACT

Systems and methods for locating users or equipment on an offshore oil rig or other hazardous location or during transit include user devices, each having a locatable element, at least one motion sensor, and data storage having identifying information relating to a user or item of equipment. Locator devices positioned at discrete locations detect the locatable elements and generate a record that includes the discrete location, the identifying information, and the speed or orientation of the user device. A central device can receive the record from each locator device, generate a log of the records, compare the log to expected parameters, receive expected deviations from the parameters, and generate alerts if a deviation is not expected. Additional locatable devices not associated with users can be provided for emergent access in escape vessels, emergency equipment, or similar locations, by users separated from a user device.

22 Claims, 2 Drawing Sheets

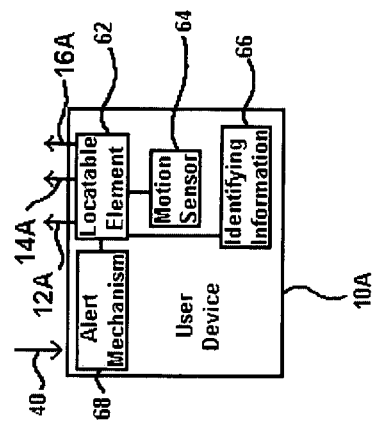
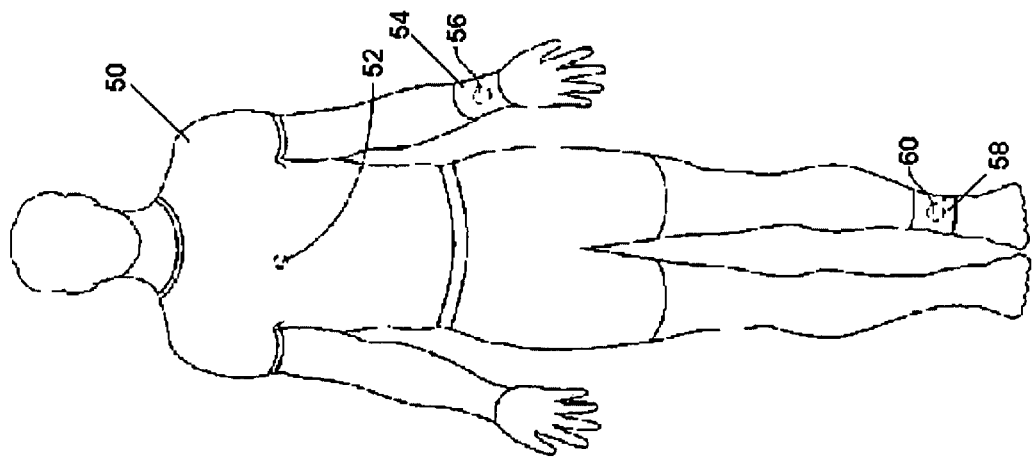
Figure 3
Figure 2

PERSONNEL ACCOUNTABILITY AN SAFETY SYSTEM

FIELD

Embodiments usable within the scope of the present disclosure relate, generally, to systems and methods usable to locate and/or monitor individuals in hazardous locations (e.g., offshore oil rigs) and/or transport vessels (e.g., fishing boats, workboats, crew boats, helicopters, etc.) for preventing death and injury to personnel and/or preventing access to restricted areas and/or prohibited behaviors, and further to locate, monitor, and/or track tools, material, parts, and/or equipment transported between remote locations (e.g., offshore locations, onshore drilling locations, etc.) and maintenance and/or storage locations.

BACKGROUND

On offshore locations (e.g., oil rigs, other semisubmersibles, cruise ships, etc.), it is necessary to maintain a roster of each individual that is present, and to periodically verify the presence of each individual, typically through attendance at a mandatory gathering and role call, dubbed a "muster drill." Due to the cumbersome and time-consuming nature of such practices, electronic, partially automated means for verifying attendance have been developed, such as through the use of radio frequency identification (RFID) tags that can be presented at designated locations by individuals, for scanning, such that an electronic attendance record can be generated and automatically compared to a roster.

However, conventional electronic scanning systems, while an improvement over a manual role call procedure, are restricted in their functionality by the limitations of the equipment. For example, RFID tags can only be detected when within proximity of a reader/scanner device, typically restricting such systems to the verification of individuals that pass through "choke points" (e.g., entrances and exits to selected areas) or predetermined gathering points for attendance verification purposes. Such systems are also generally limited to verifying the presence or absence of a specific RFID tag at a single discrete location and at a single discrete time and can only be used to detect other information, such as an individual remaining idle in a hazardous area or an individual moving at an unsafe speed, inferentially (e.g., by noting the absence of a detected RFID tag at an exit after a hazardous area was entered, or by noting the time elapsed between detection of an RFID tag at a first scanner and detection at a second scanner).

In a similar manner, when transporting materials (tools, parts, equipment, etc.) between storage and/or maintenance locations and remote and/or hazardous locations, such as offshore drilling rigs, it is necessary to inventory such materials, both before and after transit. During transit, it is possible for items to be lost or damaged. Similar limitations and difficulties are inherent in the use of RFID tags and similar technology to monitor equipment as those described above with regard to personnel.

A need exists for systems and methods capable of continuous monitoring of locations of individuals and equipment, e.g., for tracking purposes, while discrete location of individuals and/or equipment at various checkpoints can be used as a redundancy feature and to provide additional information.

A need also exists for systems and methods capable of monitoring the speed and orientation of individuals and/or equipment, while maintaining equipment that is small enough to remain wearable (e.g., attached to or within an article of clothing or jewelry) without impacting a user's movement or undertakings, and small enough to remain unobtrusive (e.g., without adding significant weight or bulk) when transporting equipment.

A further need exists for systems and methods that seamlessly and automatically recognize emergent situations, such as the absence of an expected individual or critical piece of equipment, movement at an unsafe speed (e.g., indicative of a fall or dripped piece of equipment), presence of an individual in an unsafe or unauthorized location, or an idle individual in a hazardous location for an extended period of time, and provide an alert responsive to the detection of such situations.

An additional need exists for systems and methods able to be quickly and conveniently modified to disregard certain expected deviations from parameters, such as an individual briefly traveling out of range of detection to complete a task (e.g., a "walkabout"), equipment deliberately moved to a non-standard location for maintenance or storage, or similar acceptable exceptions.

A need also exists for systems and methods able to seamlessly integrate unspecified or equipment-based locatable devices, such that individuals separated from a locatable device can access a separate device located, for example, in an escape vessel or on a piece of emergency equipment (e.g., a life vest).

Embodiments usable within the scope of the present disclosure meet these needs.

SUMMARY

Embodiments usable within the scope of the present disclosure include systems usable to locate users on an offshore oil rig or other hazardous location, and to inventory and/or track materials (tools, parts, equipment, etc.) transported between storage and/or maintenance locations and an offshore rig or similar remote location.

When locating personnel, a plurality of wearable user devices can be provided to users, each wearable user device including a locatable element (e.g., an RFID tag, a wireless (WIFI) transmitter, a global positioning (GPS) transmitter, or similar element), at least one motion sensor (e.g., a gyroscope or accelerometer) usable to determine a speed and/or orientation of the user, and data storage that includes identifying information (name, height, weight, race, eye color, hair color, gender, emergency contact information, medical information (allergies, conditions, medications), etc.) associated with the user. In an embodiment, the wearable user devices can include multiple types of locatable elements that enable both continuous and discrete locating of the devices. For example, a wearable user device could include both an RFID element, detectable at discrete locations passed/accessed by the user using an RFID scanner, and could also include a WIFI or GPS transmitter, such that the location of a user device can also be continuously monitored using a WIFI router or similar device and/or a GPS network.

When locating and/or tracking equipment, similar types of devices, attachable to equipment or containers for equipment, can be provided, each device including a locatable element, one or more emotion sensors, and data storage that includes identifying information relating to the type of equipment (model number, weight, quantity, hazardous information if applicable, etc.) Such devices can include multiple types of locatable elements that enable both continuous and discrete locating of the devices.

As such, embodied systems can also include a plurality of locator devices, each positioned at discrete location (e.g., at entrances/exits to hazardous/restricted areas, gathering/muster areas, receiving/inventory areas for equipment, etc.) and adapted to detect locatable elements of user devices. The locator devices can generate a record that includes the discrete location of the device, the identifying information relating to the particular device detected, and the speed and/or orientation of the user device (able to be determined using the one or more motion sensors).

A central device (e.g., any manner of computer or similar device having a processor in association with memory) can be provided in communication with each of the locator devices (e.g., via a wireless network or similar means), such that the central device can receive the record from each of the locator devices. Computer instructions in the memory can cause the processor to generate a log using each of the records, the log including a location of one or more user devices at a discrete time, as well as the speed and/or orientation of the associated user device. In an embodiment, the central device can also be in direct communication with one or more wearable user devices, such that the central device can detect a current location of the user devices at any time, or continuously, as well as the speed and/or orientation of each user device. Direct monitoring of a current location for each user device and detection of each user device at discrete locations using the locator devices enables both redundancy and completeness of information when generating a log.

The central device can include computer instructions for comparing detected user devices with a roster of expected user devices, and generating an alert if the log includes a deviation from the roster. In an embodiment, one or more user devices can be placed in a "walkabout mode," such that the central device can disregard deviations from the roster associated with such user devices. Similarly, the central device can include computer instructions for comparing detected user devices with a list of expected locations, and generating an alert if a user device is not present at an expected location, or if a device is present in a dangerous or restricted location, either due to delinquency of a user, malfunction of a device, misplacement of equipment, or a possible emergent situation. Additionally, the central device can include computer instructions for determining a length of time a user device has remained in one or more locations, and generating an alert if this length of time exceeds a preset parameter, either due to delinquency of a user, misplacement of equipment, or a dangerous length of time within a hazardous area indicative of a potential emergent situation.

In an embodiment, alters can be generated by the central device, the user device, or combinations thereof. For example user devices can include a high intensity vibrator (e.g., a motor or transducer) adapted to vibrate to rouse an idle and/or injured user, alert a user of an emergent situation or entry into a restricted or hazardous area, or other similar circumstances. In a similar manner, user devices can include a high pitched, high-decibel alarm to alert individuals of emergent situations, an extended period of unexpected idleness, presence of personnel or equipment in an unexpected or restricted area, and the like. By way of example, an individual that unexpectedly falls asleep during work hours (e.g., when fueling a barge or undertaking a similar task that includes a significant amount of inactive time) could be woken using a vibrating or audible alert.

In a specific embodiment, emergency vessels, life vests, and/or similar pieces of equipment can be provided with additional user devices, enabling a user that is not in possession of a wearable device to be detected by the locator devices and/or central system as an "unspecified" signal during emergent situations, thereby facilitating location of missing personnel.

Embodiments usable within the scope of the present disclosure thereby enable both continuous and discrete monitoring of locations of individuals and equipment, including monitoring the speed and orientation thereof, while maintaining equipment that is small enough to remain wearable and/or unobtrusive, while automatically recognizing emergent situations, exceptions thereto, and generating appropriate alerts.

BRIEF DESCRIPTION OF THE DRAWINGS

In the detailed description of various embodiments usable within the scope of the present disclosure, presented below, reference is made to the accompanying drawings, in which:

FIG. 2 depicts various embodiments of user devices usable within the scope of the present disclosure.

FIG. 3 a diagram of an embodiment of a user device usable within the scope of the present disclosure.

Figure 1:
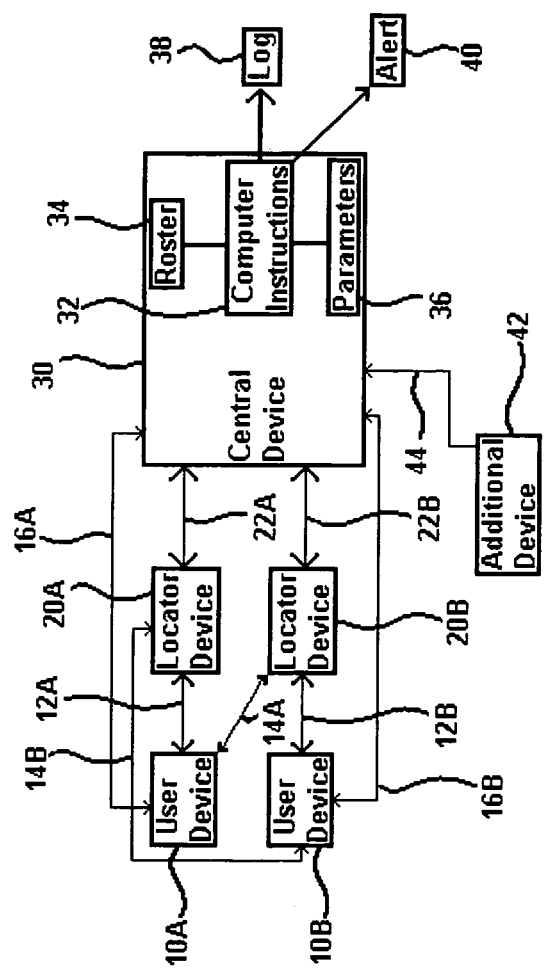
FIG. 1 depicts a diagram of an embodiment of a system usable within the scope of the present disclosure.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Referring now to FIG. 1, a diagram depicting an embodiment of a system usable within the scope of the present disclosure is shown. Specifically, FIG. 1 shows two user devices (10A, 10B), configured to communicate with two locator devices (20A, 20B) and a central device (30). It should be understood that while FIG. 1 depicts only two user devices and two locator devices for clarity, these elements are representative of any number of devices, and that embodiments of the present systems and methods can be operable with a single user device and locator device, or an infinite number, limited only by the technological capabilities (e.g., electrical and/or bandwidth) of the components used. Additionally, while FIGS. 1 through 3 depict two "user devices" (10A, 10B), designed to be worn by individuals, it should be understood that such devices could also be used in association with equipment (e.g., tools, parts, materials), containers for equipment, transport vessels for equipment or personnel, or other similar objects.

Exemplary user devices (10A, 10B) are shown in greater detail in FIGS. 2 and 3. Specifically, FIG. 2 depicts a body of an individual, illustrating an embodiment in which the user devices are small, discrete, and wearable in a manner that does not interfere with the movement or undertakings of the individual. In a similar manner, such devices could be used with equipment to be transported and/or containers for such equipment, without providing significant weight and/or bulk to a shipment.

FIG. 2 depicts the individual wearing a shirt (50), a wristband (56), and an ankle band (58) into which wearable user devices (52, 56, 60, respectively) can be integrated. It should be understood that the depicted exemplary locations of the user devices are merely illustrative, and that embodiments usable within the scope of the present disclosure can include wearable user devices incorporated into any location on or near the body, within any type of clothing or jewelry, including shirts, pants, undergarments, shoes, neckwear, watches, etc. For example, while FIG. 2 depicts a wearable user device (52) positioned near the approximate center of a shirt (50), the wearable user device (52) could be sewn within a collar, a sleeve, a pocket, a cuff, etc. Similarly, while the individual is shown wearing a wristband (54) and ankle band (58), the respective wearable user devices (56, 60) could readily be incorporated into wristwatches, ankle bracelets, socks, footwear, or any other article of clothing or jewelry, positionable at any location along an individual's limbs, torso, or head.

FIG. 3 shows a diagram of an embodiment of a usable user device (10A) having a locatable element (62), such as an RFID element (which can include a transmitter for transmitting a signal to a scanner/reader/detector, or which can simply include a chip or similar element containing information detectable by a locator device when scanned and/or positioned within range of a scanner, without requiring a transmitter), a WIFI transmitter, a GPS transmitter, or similar element able to be located using a corresponding locator device. In an embodiment, the locatable element (62) can include a plurality of types of locatable features, such as a combination of both an RFID element and a GPS transmitter, to enable location of the user device both continuously (e.g., via GPS monitoring) and during discrete instances (e.g., when passing/engaging an RFID scanner). The user device is also shown including a motion sensor (64), such as a gyroscope and/or accelerometer, for determining a current orientation and/or speed of the user device. The user device is further shown including data storage having identifying information (66) stored thereon, which, as described above, can include information unique to a user associated with the device (e.g., name, height, weight, race, gender, eye color, hair color, medical information, emergency contact information). When associated with equipment rather than an individual, the identifying information (66) can include information associated with the equipment (e.g., model number, type, quantity, hazardous information, weight, transport requirements, etc.) The identifying information and information from the motion sensor can be transmitted as signals (12A, 14A, 16A) via a transmitter, or simply detected by a locator device able to recover information from the user device in the absence of a transmitter. As known in the art, the user device (10A) can include any manner of software and processor necessary to cause a transmitter, the motion sensor, and/or the data storage to function properly; however, in an embodiment, the user device can simply include a media detectable and accessible by external locator devices without requiring a processor and programming.

Returning to FIG. 1, the first user device (10A) is shown providing a first signal (12A) to the first locator device (20A) and a second signal (14A) to the second locator device (20B). Similarly, the second user device (10A) is shown providing first and second signals (12B, 14B) to the first and second locator devices (20A, 20B), respectively. As described previously, provision of such signals can occur using a transmitter in the user device, or simply through positioning the user device within a detectable range of a locator device. For example, a user device, when activated, could continually or periodically broadcast a signal for detection by one or multiple locator devices. Alternatively, a user device could remain inactive, while locator devices could continually or periodically broadcast a signal to be received by the user device, responsive to which the user device would transmit a signal to the detected locator device. Still other embodiments could include use of a user device that is passively detected by a locator device, either through continuous or periodic scanning/querying of an area by one or more locator devices. Each locator device can be provided at a discrete location, such that when one or more user devices are detected by (e.g., pass into proximity of) a locator device, the respective locator device will obtain the respective signal from the user device, thereby obtaining the identifying information stored on the user device and an orientation and/or speed determined by the motion sensor.

Each locator device (20A, 20B) then transmits a respective signal (22A, 22B) to the central device (30), the signal including a record containing the identifying information and orientation and/or speed associated with the detected user device, as well as the discrete location (e.g., the location of the user device, the location of the detector, or both) and/or other information usable to identify the respective locator device. FIG. 1 additionally shows the user devices (10A, 10B) in direct communication with the central device (30) (e.g., via wireless (WIFI, LAN, WAN, etc.) network, a global positioning network, or similar means). Specifically, the user devices are shown transmitting respective signals (16A, 16B) to the central device (30), which can be accomplished via transmitters in the user devices and/or through detection of passive media in the user devices readable by detectors in the central device.

It should be understood that while FIG. 1 depicts a single central device, the depicted central device can be representative of a network of devices, proximate to and/or remote from a worksite, that together function to locate user devices and process information received from user devices and locator devices. The depicted central device (30) includes data storage having a roster (34) of expected user devices (e.g., expected crew members/operators that should be accounted for when all signals from the user devices (10A, 10B) and locator devices (20A, 20B) are queried by the central device (30)), and a series of parameters (36), such as expected/authorized locations of user devices, acceptable speeds and/or orientations of user devices, acceptable lengths of time for which a user device can remain within a certain location, and other similar factors. Computer instructions (32) associated with the central device can be used to process the signals (16A, 16B) received from the user devices (10A, 10B), and the signals (22A, 22B) received from the locator devices (20A, 20B), to generate a log (38) containing the current time, and current location of each detected user device, as indicated by the signals (16A, 16B), and as detected by the locator devices (20A, 20B).

In an embodiment, the computer instructions (32) can cause the central device to compare the log (38) with the roster (34) and/or the parameters (36) to determine whether one or more users are absent from an expected location, present in an undesired location (e.g., a hazardous and/or prohibited location), or absent from the offshore rig or similar site entirely. An alert signal (40) can be generated if any deviations are present in the log (38). Similarly, a comparison between the log (38) and the parameters (36) can identify whether a user device deviates from acceptable speeds and/or orientations, acceptable lengths of time within certain locations, and other factors. In an embodiment, individual user devices and/or groups of user devices can be placed in a "walkabout mode," such as when it is necessary for one or more users to move to a location and/or range where a user's associated user device would be undetectable by the system. The absence of and/or any other deviations associated with user devices placed in a walkabout mode that are present in the log (38) can be ignored such that an alert signal (40) is not generated responsive to such data.

In a further embodiment, the alert signal (40) generated by the central device can be received by the user device (10A) that triggers the alert, as illustrated in FIG. 3. Responsive to receipt of the alert signal (40), computer instructions in the user device (10A) can cause actuation of an alert mechanism (68), such as a vibrator (e.g., motor, transducer), an audible alarm, or other types of audible, tactile, and/or visible indicia. By causing an alert to be generated locally, at the discrete user device (10A), an idle user can be roused if improperly asleep, injured, and/or incapacitated, or if the user enters a hazardous and/or restricted location. Further, one or multiple user devices can be caused to generate an alert if an emergent situation develops that would affect multiple users (e.g., every user located on a rig or similar location.) In a similar manner, attempts to transport equipment to an improper location could cause the generation of an audible or visible alert by a device associated with the equipment.

FIG. 1 further shows an additional locatable device (42), which can be representative of any number of locatable devices similar to the user devices (10A, 10B). For example, when a user is separated from his or her user device (e.g., during an emergent situation where a user may be required to abandon an offshore rig or similar hazardous location without wearing and activating a user device), a user can obtain and activate an additional locatable device (42) associated, for example, with a wearable life vest, a life preserver, an escape vessel, or other types of equipment and/or vessels. The additional locatable device (42) can transmit a signal (44) detectable by the central device (30), or the central device (30) could passively detect the signal (44) of the additional locatable device (42), as described previously. Additionally or alternatively, the locator devices (20A, 20B) could be configured to detect the additional locatable device (42). Because the additional locatable device (42) would not typically be associated with a specific user, the signal (44) can instead include information identifying the equipment and/or vessel with which the additional locatable device (42) is associated. The computer instructions (32) can include programming that enables the central device (30) to query the roster (34) for users that are not detected, such that the possible identity of the user activating the additional locatable device (42) can be inferred. Information obtained through a comparison of the roster (34) with the "unspecified" signals (44) obtained from additional locatable devices (42) can be included in the log (38).

Embodiments usable within the scope of the present disclosure thereby provide systems and methods capable of continues monitoring of locations of individuals, and discrete detection at various locations, that can include equipment for monitoring a user's speed and orientation, while remaining wearable without impacting the user's movement or undertakings. Embodiments described herein can also enable automatic detection of emergent situations (e.g., the absence of an expected user, movement at an unsafe speed, presence of users in a hazardous or unauthorized location, idle users, etc.) and provision of an alert, while also enabling exceptions to expected parameters to be recognized and ignored. Further, embodiments described herein can enable integration of separate, unspecified and/or equipment-based locatable devices, usable by users separated from their locatable devices.

While various embodiments usable within the scope of the present disclosure have been described with emphasis, it should be understood that within the scope of the appended claims, the present invention can be practiced other than as specifically described herein.

What is claimed is:

1. A system for locating users on an offshore oil rig or other hazardous location, the system comprising:
   a plurality of user devices, wherein each of said wearable devices comprises:
      a locatable element adapted to be detected by a corresponding locator device;
      at least one motion sensor adapted to determine a speed of the user device, an orientation of the user device, or combinations thereof; and
      data storage comprising identifying information relating to a user or piece of equipment associated with the device;
   a plurality of locator devices, wherein each of said locator devices is positioned at a discrete location, and wherein each of said locator devices is adapted to detect said locatable elements of said plurality of user devices and generate a record comprising the discrete location, the identifying information, and at least one of the speed and the orientation of the user device; and
   a central device adapted to receive the record from each of said locator devices, wherein the central device comprises a processor in communication with data storage comprising computer instructions for instructing the processor to receive each of said records received from each of said locator devices and generate a log using each of said records, wherein the log comprises a location of at least one user device at a discrete time and at least one of the speed and the orientation of the at least one user device at the discrete time.

2. The system of claim 1, wherein the locatable element comprises a transmitter adapted to transmit a signal comprising the identifying information and said at least one of the speed and the orientation, and wherein the plurality of locator devices comprise receivers adapted to detect the signal and transmitters adapted to transmit the discrete location, the identifying information and said at least one of the speed and the orientation to the central device.

3. The system of claim 2, wherein the transmitter comprises a global positioning transmitter, wherein the plurality of locator devices comprise elements within a global positioning network, and wherein the central device is in communication with the global positioning network.

4. The system of claim 1, wherein the locatable element and the plurality of locator devices are in networked wireless communication to enable continuous monitoring of the locatable element.

5. The system of claim 1, wherein the locatable element comprises a radio frequency identification tag, and wherein the plurality of locator devices comprise scanners adapted to detect and scan the radio frequency identification tag and receive the identifying information and said at least one of the speed and the orientation when the radio frequency identification tag is within a selected distance of the discrete location.

6. The system of claim 1, wherein said at least one motion sensor comprises a gyroscope, an accelerometer, or combinations thereof.

7. The system of claim 1, wherein the identifying information comprises a name of a user, a height of the user, a weight of the user, a race of the user, a gender of the user, an eye color of the user, a hair color of the user, at least one medical condition, allergy, or medication of the user, emergency contact information associated with the user, or combinations thereof.

8. The system of claim 1, wherein at least one of said user devices is incorporated within an article of clothing or jewelry.

9. The system of claim 1, wherein the central device further comprises computer instructions for generating an alert when at least one parameter of the log exceeds a preset criterion.

10. The system of claim 9, wherein at least one of said user devices, the central device, or combinations thereof, comprises a processor and computer instructions for instructing the processor to place said at least one of said user devices in a walkabout mode during which said at least one parameter is disregarded.

11. The system of claim 1, wherein the locatable element comprises a transmitter adapted to transmit a signal comprising the identifying information and said at least one of the speed and the orientation, and wherein the central device comprises a receiver adapted to detect the signal and computer instructions for instructing the processor to identify a current location of the locatable element and generate the log using the current location and the signal.

12. The system of claim 1, further comprising at least one auxiliary locatable element associated with a vessel, an item of equipment, or combinations thereof, and wherein said at least one auxiliary locatable element is adapted for detection by the plurality of locator devices, the central device, or combinations thereof for enabling location of users associated with the vessel, the item of equipment, or combinations thereof.

13. The system of claim 1, wherein the data storage in the central device further comprises a roster of expected user devices and computer instructions for instructing the processor to generate an alert if the log comprises a deviation associated with a respective user device from the roster of expected user devices.

14. The system of claim 13, wherein at least one of said user devices, the central device, or combinations thereof, comprises a processor and computer instructions for instructing the processor to place said the respective user device in a walkabout mode, and wherein the computer instructs further instruct the processor to disregard the deviation associated the respective user device.

15. The system of claim 1, wherein the data storage in the central device further comprises a roster of expected locations associated with respective user devices and computer instructions for instructing the processor to generate an alert if the log comprises a deviation associated with the roster.

16. The system of claim 1, wherein the central device further comprises computer instructions for instructing the processor to determine a length of time a respective user device has remained in a selected location and generate an alert if the length of time exceeds a preset parameter.

17. A method for locating users or equipment on an offshore oil rig or other hazardous location, the method comprising the steps of:
   providing each user of a plurality of users with a respective wearable user device;
   providing each respective wearable user device with identifying information relating to a respective user associated with the respective wearable user device;
   detecting a locatable element of at least one of the respective wearable user devices using a central device and generating a log comprising a current location of said at least one of the respective wearable user devices and the identifying information associated with said at least one of the respective wearable user devices; and
   detecting the locatable element at a discrete location using a locator device, wherein the locator device generates a record comprising the discrete location and the identifying information associated with said at least one of the respective wearable user devices, and wherein the locator device transmits the record to the central device for generation of the log.

18. The method of claim 17, wherein the step of detecting the locatable element using the central device, detecting the locatable element using the locator device, or combinations thereof, further comprises receiving an orientation of said at least one of the respective wearable user devices, a speed of said at least one of the respective wearable user devices, or combinations thereof from a motion sensor associated with said at least one of the respective user devices.

19. The method of claim 17, further comprising providing the central device with at least one preset criterion and generating an alert when at least one parameter of the log deviates from said at least one preset criterion.

20. The method of claim 17, further comprising the step of comparing the log with a roster comprising a list of expected user devices and generating an alert if the log deviates from the list of expected user devices.
   wherein said at least one motion sensor comprises a gyroscope, an accelerometer, or combinations thereof.

21. The method of claim 20, further comprising placing at least one wearable user device in a walkabout mode and disregarding a deviation associated with said at least one wearable user device.

22. The method of claim 17, further comprising the steps of determining a length of time a respective wearable user device has remained in a selected location and generating an alert if the length of time exceeds a preset parameter.

* * * * *